United States Patent [19]

Bodnar

[11] Patent Number: 4,765,591

[45] Date of Patent: Aug. 23, 1988

[54] GATE VALVES

[76] Inventor: Thomas R. Bodnar, 3378 MacIntyre Ave., Murrysville, Pa. 15668

[21] Appl. No.: 56,154

[22] Filed: Jun. 1, 1987

Related U.S. Application Data

[63] Continuation-in-part of Ser. No. 874,529, Jun. 16, 1986, abandoned, and a continuation-in-part of Ser. No. 734,781, May 16, 1985, abandoned.

[51] Int. Cl.⁴ ............................................. F16K 3/18
[52] U.S. Cl. .................................... 251/330; 251/189; 137/797
[58] Field of Search ................ 137/797, 377; 251/187, 251/189, 191, 214, 330

[56] References Cited

U.S. PATENT DOCUMENTS 3,912,221 10/1975 Fenster ................................ 251/214
4,240,462 12/1980 Bankstahl ............................ 137/377

FOREIGN PATENT DOCUMENTS 47217 3/1982 European Pat. Off. ............ 137/797
98310 7/1961 Norway .............................. 251/187
200699 12/1965 Sweden ............................... 251/187

Primary Examiner—A. Michael Chambers
Assistant Examiner—John C. Fox
Attorney, Agent, or Firm—Paul Bogdon

[57] ABSTRACT

A gate valve is provided having a valve body with a fluid passage therethrough and a riser passage at right angles to the fluid passage. A valve gate is included for opening and closing the fluid passage. A valve stem is operatively connected with the valve gate for transmitting movement force to the valve gate. The valve stem includes a first wrench for receiving a drive member and an identically shaped second wrench head. The wrench heads are separated by a first zone of weakness formed to fail completely when a first predetermined torque is applied to the stem. Upon complete failure of the first zone of weakness the second wrench head would be exposed for engagement by a drive member to turn the valve stem. A second zone of weakness is formed on the valve stem below the first zone of weakness and is formed to fail when a second predetermined torque greater than the first predetermined torque is applied to the stem. The valve gate has a one piece body with a seal member removably arranged on the body to engage the valve body in the fluid passage.

6 Claims, 2 Drawing Sheets

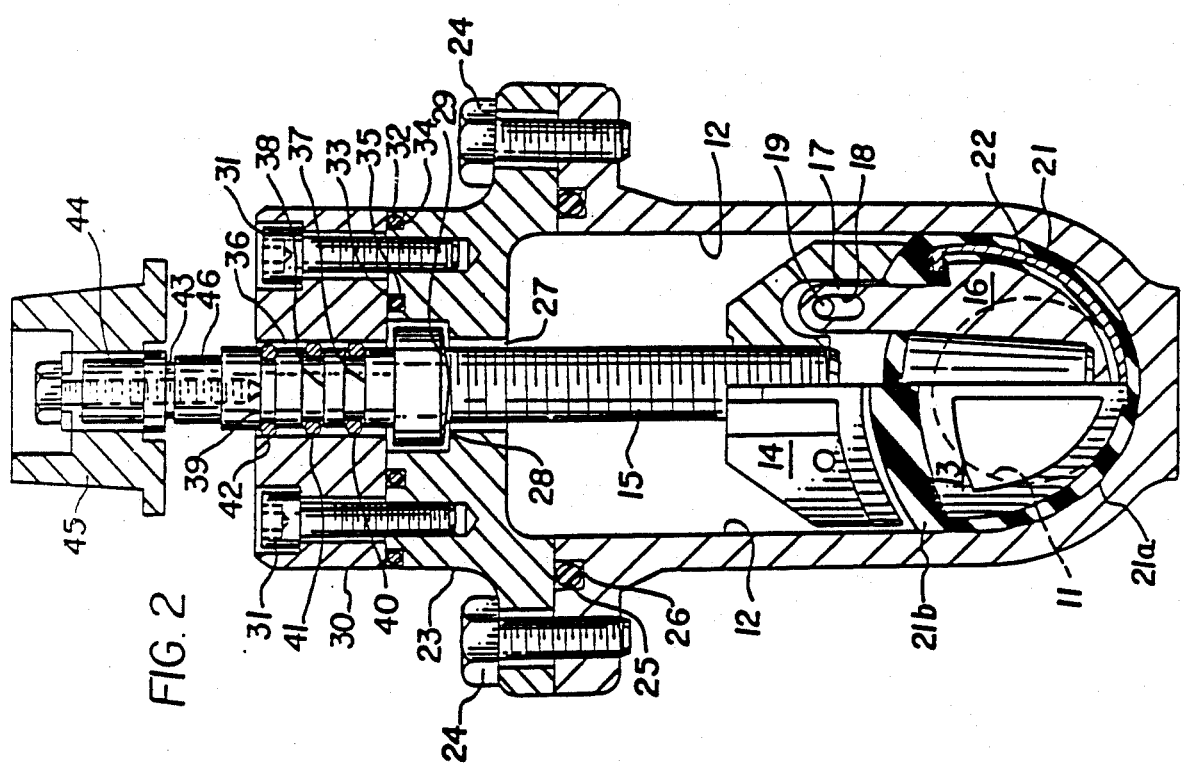
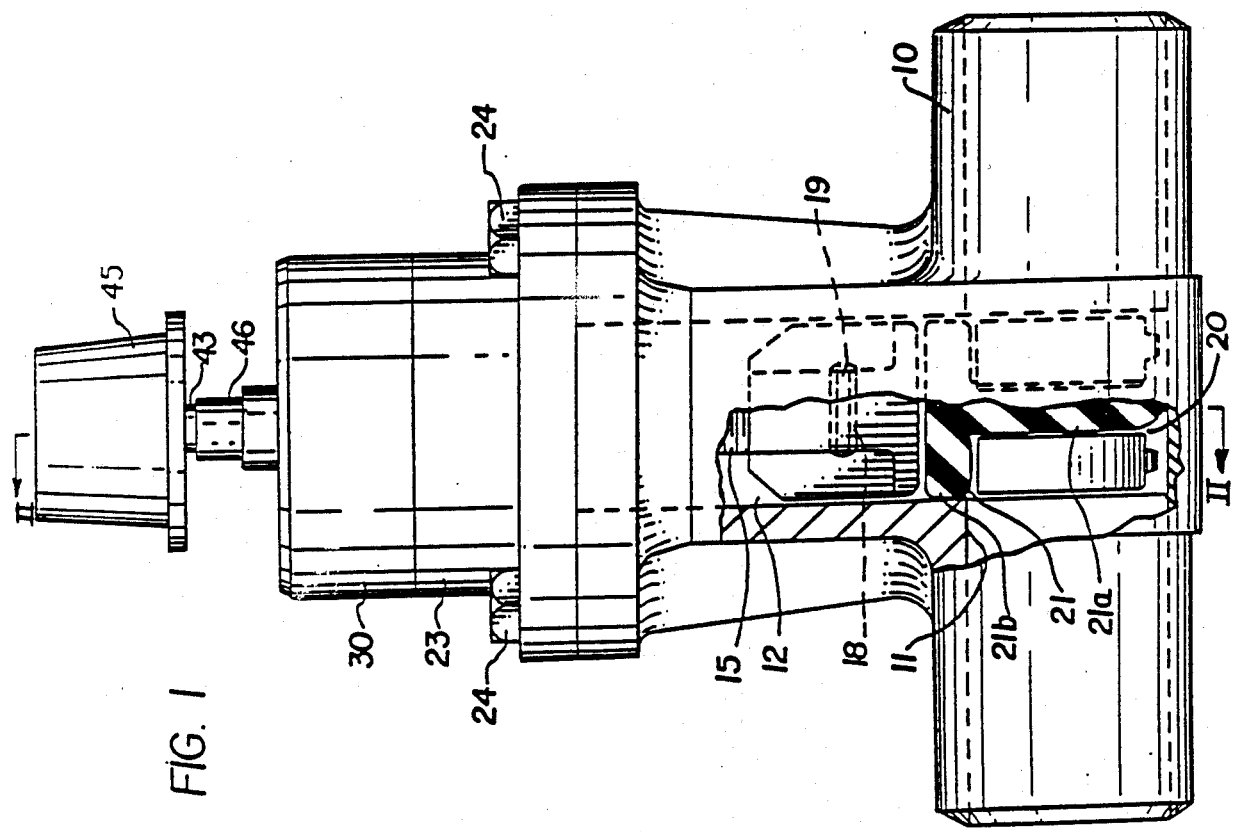

GATE VALVES

RELATIONSHIP TO OTHER PATENT APPLICATIONS

This patent application is a continuation-in-part of U.S. patent application Ser. No. 734,781, filed May 16, 1985 in the name of Thomas R. Bodnar for Gate Valves, now abandoned, and a continuation-in-part of U.S. patent application Ser. No. 874,529, filed June 16, 1986 in the name of Thomas R. Bodnar for Gate Valves and now abandoned.

BACKGROUND OF THE INVENTION

This invention relates to gate valves and particularly to a "soft seal" type gate valve having controlled overtorque stem failure modes and a simplified seal system.

Gate valves of various types have been in use for many years. In general, gate valves are so called "hard seal" valves in which the gate valve is sealed in a metal to metal or hard seal. Such hard seal valves have numerous drawbacks in use. First, in order to make a seal the seal surfaces must match perfectly. This requires very precise machining and fitting of the valve parts which is expensive. Secondly, the seal faces are readily damaged and the seal leaks. Thirdly, the seal surfaces are likely to stick because of corrosion, gum formation or any of a variety of reasons, resulting in the valve becoming inoperative or broken by attempts to release it. More recently, "soft seal" gate valves have been proposed. These valves have elastomer inserts at the sealing surfaces to make and complete the seal under pressure. These valves solve the problems discussed above in connection with hard seal gates valves, but have problems of their own. The known soft seal valves most often use double matching piece gate construction where the gate pieces are mechanically fastened around the seal member. The double piece construction is expensive to form. Moreover, it has been found that fluid leakage results around the fasteners holding the pieces. Leakage also results when the pieces are slightly misaligned due to machining and assembly errors. It is also possible for the fasteners to fail when the gate having misaligned pieces is urged into engagement with the valve body in the fluid passage. Other soft seal valves propose using a single piece gate with the seal molded onto the gate body. The single piece gate construction requires special equipment and elaborate processes to produce and as a result is expensive to manufacture.

My invention also provides for overtorque failure of the stem. This feature is significant in that it allows for continued use of the gate valve after an initial stem failure and also avoids internal damage to the valve gate and other internal portions of the valve. My overtorque feature is best understood by considering the problems inherent in existing gate valves from overtoruqe stem failure. One of the most common causes of valve failure is overtorquing the valve stem. When such a failure results the gate valves are most often replaced or repaired at great expense compounded when the gate valve is in an underground setting and must be dug out of the ground upon failure. If the internal damage is not excessive the valve may still need to be removed and the damaged parts replaced. In either case the gate valve must be replaced or repaired since it is no longer functional. A most serious problem arises when an overtorque failure occurs to a gate valve that is in a hazardous service application such as in a natural gas pipeline and there is a fire downstream of the valve. Often in this type of emergency the valve may not be capable of being fully closed when first operated and as a result gas will continue to flow into the fire zone. Due to the critical nature of the emergency, additional torque is normally applied to the valve stem in an attempt to effect a tight closure. Although the valve may be finally closed, time may be lost and the additional torque applied to the valve stem may result in a stem failure or damage to internal parts of the valve locking the gate in a closed position and making further operation of the valve impossible. The fire may be contained, however, the inoperable valve may create another emergency as critical as the first. This second emergency may occur during inclement weather when an urgen need exists to quickly reopen the valve in order to reinstate gas service to high risk users such as hospitals, schools and the elderly. In this case the inoperable valve may greatly increase the risk to these users. It is therefore absolutely necessary that a valve function to close as well as to open, esepcially in emergency situations as described. In addition, because time-is-of-the-essence in many emergencies, it is just as critical that the operation of a valve be accomplished in the minimum of time. Gate valves currently in use do not provide this margin of operational dependability.

This invention overcomes the aforementioned problems related to hard seal gate valves as well as those problems of known soft seal gate valves. My invention also overcomes the overtorque failure problems of all known existing gate valves and in doing so provides the extra margin of operational dependability required in emergency situations. My gate valve is simply constructed with a valve stem having two wrench head positions with respective zones of weakness designed to fail in torsion at predetermined and progressively greater magnitudes of torque. Under normal service conditions the stem strength in both wrench head positions is more than sufficient to operate the valve. Should the valve stem be overtorqued the first or outermost wrench head will fail at the first zone of weakness at a predetermined low magnitude of torque. This first controlled failure will result in the complete detachment of the wrench nut and first wrench head. The magnitude of overtorque required to fail the first zone of weakness is kept so low that no damage is caused to any other elements of the valve. The valve remains fully operational as the second wrench head position becomes accessible and may be easily grasped by the original wrench nut or by a standard socket drive member in order to continue rotating the stem to operate the valve gate. In the second wrench head position a predetermined overtorque greater in magnitude than the first but less than that of the main body of the valve stem would be necessary to cause failure in the second zone of weakness. My unique valve gate is formed of a single piece body having a shape suitable for receiving a seal member which is easily installed and removable from the valve gate. My overtorque protection stem and valve gate seal combination may be fabricated at costs allowing the gate valves to be sold at prices acceptable to customers.

SUMMARY OF THE INVENTION

The gate valve assembly of this invention in its preferred form includes a valve body having a fluid passage therethrough and a riser passage at right angles to the fluid passage; bonnet means closing the riser passage; valve gate means for selectively opening and closing the fluid passage and movable in the riser passage from a closure position to an open position; a valve stem operably connected with the valve gate means for transmitting movement force to the valve gate means; and a removable seal member on the gate valve means arranged to engage the valve body in the fluid passage. The valve stem is comprised of an elongated body having one end region thereof formed to operatively engage the valve gate means and the other end region extending outwardly of the bonnet means; seal means intermediate the ends of the body for engaging the bonnet means in sealed relationship therewith; first wrench head means on the other end region of the body for removably securing a drive member to the first wrench head means; second wrench head means on the body of the other end region adjacent to and spaced from the first wrench head means; the second wrench head means shaped and constructed substantially the same as the first wrench head means for removably securing a drive member; a first zone of weakness formed on the body between the first and second wrench head means formed to completely fail at a first predetermined torque applied to the body to thereby expose the second wrench head means for being grasped by a drive member, the first predetermined torque being less than the magnitude of the overtorque required to fail the body of the valve stem, and whereby the body of the valve stem remains operative with the valve gate means to transmit movement force thereto; a second zone of weakness formed on the body below the second wrench head formed to fail at a second predetermined torque greater than the first predetermined torque applied to the body and also less than the magnitude of the overtorque required to fail the valve stem. The valve gate means of my invention preferably comprises a generally semicylindrical one piece body having a lower generally circular portion and an upper portion with the body arranged to selectively completely close the fluid passage; compressor means operatively secured to the body and engageable with the upper portion of the body and also engageable with one end region of the valve stem for movement within the riser passage from a closure position where the body intersects the fluid passage to an open position where the fluid passage is completely opened and to transfer force onto the body for urging the body into a closed relationship with the fluid passage; and a removable seal means on the body disposed at least on the circular outer periphery of the lower portion of the body and arranged to engage the valve body in the fluid passage. The valve gate of my invention is preferably formed with a centrally disposed circumferential groove on its circular periphery with the seal means having a generally U-shaped lower section snugly and removably received in the groove. The seal means also has a generally rectangular upper section secured to the upright portion of the U-shaped lower sections with the upper sections snugly and removably received on the upper portion of the gate body. A metal spring member is imbedded in the U-shaped portion of the seal member for urging the seal member into a preselected form and for securing it in the groove of the valve gate. My invention permits the valve stem to fail at two selected locations in two predetermined magnitudes of overtorque whereby the first wrench head is completely detached at the lower magnitude of overtorque and the second wrench head is exposed for transmitting the force necessary to continue moving the valve gate into an open or closed relationship with the fluid passage. In the event a second overtorque of higher magnitude than the first is applied to the second wrench head, the second zone of weakness will fail and will result in the inability to continue turning the valve stem. Upon failure of the second zone of weakness only the valve stem would have to be removed and replaced as no damage will be caused to the valve gate and other internal elements. My valve gate construction being a single piece body avoids the problems of leakage about the fasteners used in double piece gate bodies while at the same time providing a positive seal within the fluid passage of the gate valve.

Various other advantages, details, and modifications of the present invention will become apparent as the following description of a preferred embodiment proceeds.

DESCRIPTION OF THE DRAWINGS

In the accompanying drawings I show a certain preferred embodiment of this invention in which:

FIG. 1 is a side elevation view partly in section of a gate valve embodying the present invention;

FIG. 2 is a section on the line II—II of FIG. 1;

DETAILED DESCRIPTION OF A PREFERRED EMBODIMENT

Figure 3:
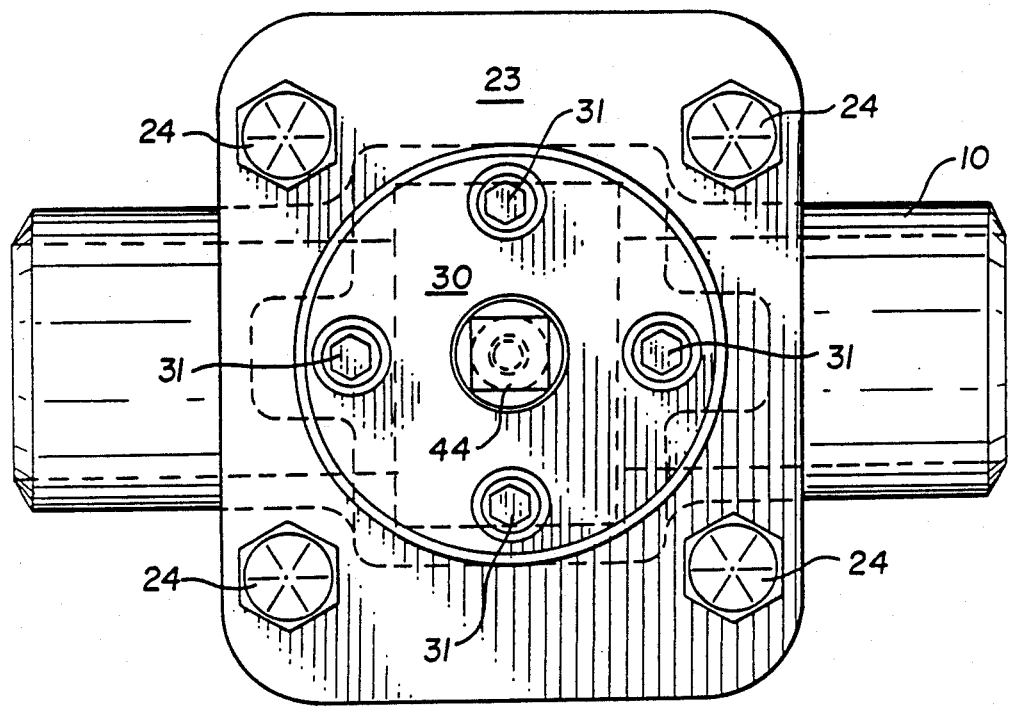
FIG. 3 is a plan view of the gate valve of FIG. 1 with the wrench nut assembly removed.
Figure 4:
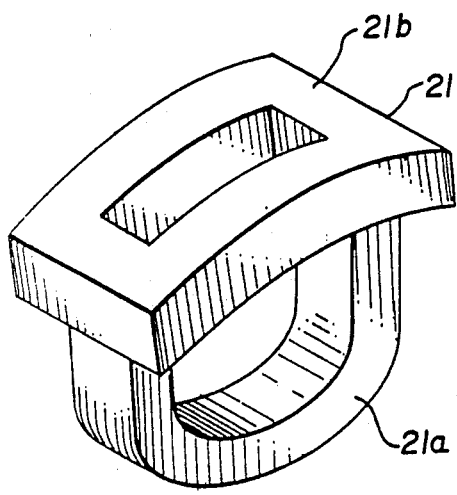
FIG. 4 is a perspective view of the seal member forming part of the present invention.
Figure 5:
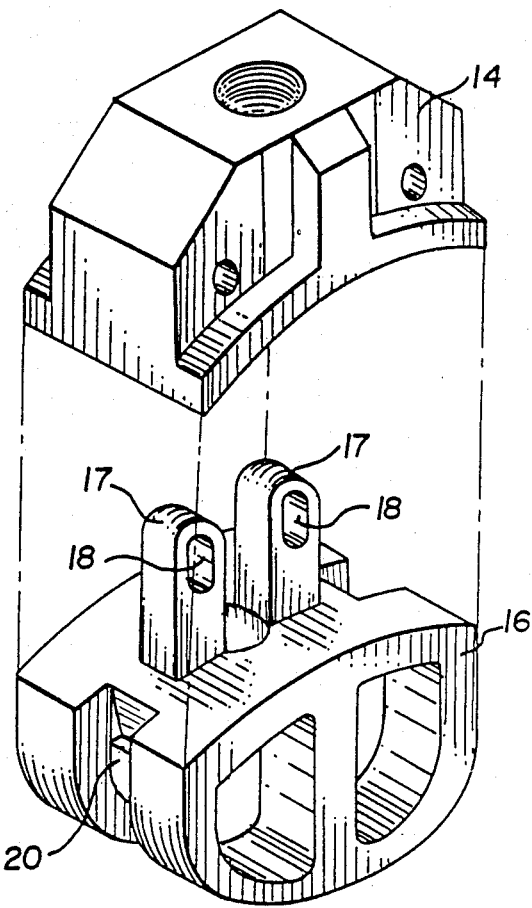
FIG. 5 is an exploded perspective view of the valve gate means of the present invention.

Referring now to the drawings, there is shown a gate valve having a valve body 10 with a through passage 11 and a transverse rectangular riser passage 12. A valve gate assembly 13 is movable vertically in the rectangular passage from a closure position intersecting and sealing through passage 11 (as shown in FIGS. 1 and 2) to an open position fully retracted in rectangular passage 12 above through passage 11. The valve gate assembly 13 includes a compressor 14 threaded onto the end of valve stem 15 for movement up and down valve stem 15 within rectangular passage 12. A semicylindrical gate body 16 is suspended from compressor 14 on arms 17 having slots 18 engaged on pins 19 in the compressor. The gate body 16 has an annular groove 20 around the periphery of its lower circular portion. The gate body 16 receives an elastomer seal ring 21 having a generally U-shaped lower portion 21a and a generally rectangular shaped upper portion 21b which is secured to the leg portions of the lower portion 21a. The seal ring 21 is constructed such that the lower portion 21a will be snugly and removably received in groove 20 of the gate body 16 while the upper portion 21b will be snugly received on the top portion of the gate body. The seal ring 21 is provided with an internal metal spring 22 designed to hold the lower portion 21a of the seal ring 21 in a preselected shape and to lock the seal ring onto the gate body 16. The rectangular passage 12 is closed by bonnet 23 held in place by bolts 24 and sealed to the valve body by an O-ring 25 in groove 26 of the valve body 10. The bonnet has a central passage 27 through which stem 15 extends. The passage 27 is provided with a shoulder 28 which receives an annular tapered hard seal flange 29 formed on stem 15. This metal to metal or "hard seal" is used to back seat or back seal the valve. It provides a second valve within the valve which makes it possible to remove the gland retainer 30, if necessary while the valve is in pressurized service, which is fastened to bonnet 23 by bolts 31 and sealed to bonnet 23 by O-rings 32 and 33 in concentric grooves 34 and 35 in the top of bonnet 23. The passage 36 in the gland retainer carries stem 15 out of the valve body assembly. The stem is provided with grooves 37, 38 and 39 carrying O-rings 40, 41 and 42 to seal the stem in gland retainer 30. The uppermost groove 39 is formed to provide a zone of weakness, identified herein as the second zone of weakness, calculated to fail when there is applied to the valve stem 15 a second predetermined torque less in magnitude than the torque required to fail the main body of the valve stem. This second zone of weakness is simply formed by making the diameter of groove 39 smaller than the diameters of the grooves 37 and 38. A first zone of weakness is provided in a groove 43 of a diameter less than the diameter of groove 39 as well as grooves 37 and 38 and is formed on the stem immediately below a generally square first wrench head 44 which is shaped and sized to carry a wrench nut 45. The stem 15 is also provided with a second generally square wrench head 46 formed between grooves 43 and 39. The second wrench head 46 is identically shaped to that of the first wrench head 44 and is likewise shaped and sized to receive wrench nut 45. It is also to be noted that both the first and second wrench heads 44 and 46 may be sized and shaped to receive a socket forming part of a socket wrench assembly.

The first zone of weakness formed in groove 43 will fail first when a first predetermined overtorque is applied to the stem 15. The overtorque required to fail the first zone of weakness of groove 43 would also be less than the overtorque required to fail the main body of the valve stem 15. The first predetermined overtorque would be less than the second overtorque that would cause the second zone of weakness formed in groove 39 to fail. As stated previously, the overtorque required to fail the second zone of weakness of groove 39 would also be less than the overtorque required to fail the main body of valve stem 15. The failure of the first zone of weakness will be a complete failure resulting in the complete detachment of wrench head 44 and wrench nut 45 and exposure of the second wrench head 46 which may then be grasped by a wrench nut 45 or the socket of a socket wrench assembly.

In operation a torque is applied to the wrench nut 45 to rotate the valve stem 15 to move the valve gate 16 downwardly until it reaches the bottom of passage 11. Continued rotation of the valve stem 15 forces the compressor 14 downwardly against the elastomer seal ring 21 causing the seal ring to engage the peripheral wall of the riser passage 12 at passage 11 and to expand axially to engage the rectangular periphery of passage 12 above passage 11 so that a full and complete seal is made. It is to be noted that any reference to valve gate means includes both the valve gate 16 and the compressor 14 as well as all of the elements which operatively couple valve gate 16 to the compressor 14.

When the valve stem 15 is rotated in the opposite direction the compressor 14 rises first, causing the elastomer seal ring 21 to relax away from the sealing surfaces at the peripheral walls of passage 11 and 12, after which the gate body 16 is picked up by pins 19 and the entire valve gate is lifted into riser passage 12 above passage 11.

To back seat the valve in order to remove gland retainer 30 while the valve is in pressurized service, stem 15 is rotated in the direction that will lift valve gate assembly 13 upwards in riser passage 12 above fluid passage 11. Rotation is continued in this direction until compressor 14 stops against the internal surface of bonnet 23. Once the stop condition is reaches, stem 15 is rotated in this same direction a slight additional amount. This final rotation will force stem 15 downwards and cause annular tapered hard seal flange 29 to act tightly downwards onto shoulder 28 thereby sealing passage 27 from passage 36 in gland retainer 30. When this action is completed the valve is back seated and fluid flow from passages 11, 12 and 27 will be prevented from entering passage 36. Gland retainer 30 may now be removed from bonnet 23 by removing wrench nut 45 and bolts 31.

In the event that an excessive torque is applied to valve stem 15 in either direction, the first zone of weakness formed at groove 43 will completely fail whenever a first predetermined overtorque is reached. The second wrench head 46 will thereby be exposed and an operator may simply place the wrench nut 45 thereon and continue rotating the valve stem 15 to cause the valve gate 16 to move into closed or open position with respect to the passage 11. Thus, the overtorque of the first predetermined mangitude will result in the failure at the first zone of weakness but will allow the valve to continue to be operated. The valve stem 15 will remain operatively connected to the valve gate 13 whereby a closing or opening force may be transmitted from the second wrench nut 46 through the valve stem 15 to move the gate body 16 into closed or opened relationship with passage 11. In the event a second predetermined magnitude of torque is applied to the valve stem 15 the second zone of weakness at groove 39 will fail and the valve stem 15 will no longer be capable of being rotated. When the second mode of failure results, the valve will have to be disassembled and the valve stem 15 replaced. The second mode of failure to the valve stem 15 will prevent any continued overtorquing of the valve stem thereby preventing any internal damage to the other internal elements of the valve. One typical type of internal valve failure which could result from overtorquing the valve stem 15 would be a stripping of the threads on the valve stem 15 where those threads engage the compressor 14. Similarly, the threads in the compressor 14 could also be stripped due to the overtorquing of the valve stem 15. In either event, the valve would not work and would have to be either replaced or the compressor or stem replaced.

The advantage of having the capability of continuing to operate the valve stem 15 after the first mode of failure is to insure a closing or opening of the valve where an emergency situation exists. It would be after the emergency ceased that the valve stem 15 might be replaced. As noted earlier, when a valve stem not embodying my invention fails because of overtorque and there is no secondary means of continuing the operation of the valve stem, then the valve may be locked in an open or closed position resultiing in a compounding of an emergency situation which would ordinarily demand that the valve be fully operational.

It should now be clearly understood how the gate valve of this invention provides the overtorque safety advantages, simplified sealing system advantages and repair cost savings over heretofore known gate valve assemblies. Also, it should be readily apparent to those skilled in this art that the overtorque safety features and simplified sealing systems of this invention may be modified and structured to accommodate particular means without deviating from the scope of the invention.

While I have shown and described a present preferred embodiment of this invention, it is to be distinctly understood that the invention is not limited thereto, but may be otherwise embodied and formed within the scope of the following claims.

I claim:

1. A gate valve assembly comprising:
a valve body having a fluid passage therethrough and a riser passage at right angles to the fluid passage;
bonnet means closing said riser passage;
valve gate means for selectively opening and closing of fluid passage and movable in the riser passage from a closure position to an open position;
valve stem means operably connected with said gate valve means for transmitting movement force to said gate valve means;
said valve stem means including an elongated body having one end region thereof formed to operatively engage said valve gate means for transmitting opening and closing forces thereto and the other end region extending outwardly of said bonnet means;
seal means intermediate the ends of said elongated body for engaging said bonnet means in sealed relationship therewith;
first wrench head means on said other end region of said elongated body for removably receiving a drive member;
securing means for removably securing a drive member to said first wrench head means;
second wrench head means on said elongated body on said other end region adjacent to and spaced from said first wrench head means;
said second wrench head means shaped and constructed substantially the same as said first wrench head means for removably securing a drive member;
a first zone of weakness formed on said elongated body between said first and second wrench head means formed to fail at a first predetermined overtorque applied to said elongated body, said first predetermined overtorque being less than the overtorque required to fail said elongated body of said valve stem, and whereby said elongated body and said second wrench head remain operative with said gate valve means for transmitting opening and closing forces thereto;
a second zone of weakness formed on said elongated body below said second wrench head formed to fail at a second predetermined overtorque greater than said first predetermined overtorque applied to said elongated body, said second predetermined overtorque being less than the overtorque required to fail said elongated body of said valve stem;
said valve gate means formed of a generally semicylindrical one piece body arranged to selectively completely close or open said fluid passage;
said valve gate means including a compressor means operably secured to said one end region of said elongated body for movement within said riser passage from a closure position where said one piece body intersects said fluid passage to an open position where said fluid passage is completely open and to transfer force onto said one piece body for urging said body into closed or open relationship with said fluid passage; and
removable seal means on said body disposed on the circular periphery of said one piece body and arranged to engage said valve body in said fluid passage.

2. In combination with a gate valve including a valve body having a fluid passage therethrough and a riser passage at right angles to the fluid passage; bonnet means closing said riser passage; valve gate means for selectively opening and closing the fluid passage and movable in the riser passage from a closure position to an open position; a valve stem operably connected with said valve gate means for transmitting movement force to said valve gate means, said valve stem comprising:
an elongated body having one end region thereof formed to operatively engage said valve gate means and the other end region extending outwardly of said bonnet means;
seal means intermediate the ends of said body for engaging said bonnet means in sealed relationship therewith;
first wrench head means on said other end region of said body for removably receiving a drive member;
securing means for removably securing a drive member to said first wrench head means;
second wrench head means on said body on said other end region adjacent to and spaced from said first wrench head means;
said second wrench head means shaped and constructed substantially the same as said first wrench head means for removably securing a drive member;
a first zone of weakness formed on said body between said first and second wrench head means formed to fail completely at a first predetermined overtorque applied to said body to expose said second wrench head means for operative engagement by a drive member, said first predetermined overtorque being less than the overtorque required to fail said elongated body, and whereby said elongated body and said second wrench head remain operative with said gate valve means for transmitting movement force thereto; and
a second zone of weakness formed on said body below said second wrench head formed to fail at a second predetermined overtorque greater than said first predetermined overtorque applied to said body, said second predetermined overtorque being less than the overtorque required to fail said elongated body.

3. In the combination as set forth in claim 2, wherein said first and second wrench heads are formed to receive a socket wrench.

4. In the combination as set forth in claim 2, wherein said first and second zones of weaknesses are annular grooves formed in said body.

5. The combination as set forth in claim 2, wherein said second zone of weakness is formed to receive at least a portion of said seal means.

6. In the combination as set forth in claim 2, including wrench nut means removably engagable with said first wrench head means and with said second wrench head means when said first wrench head means is removed from said body after overtorque failure of said first zone of weakness.

* * * * *